United States Patent [19]

Bunn et al.

[11] Patent Number: 5,134,925
[45] Date of Patent: Aug. 4, 1992

[54] AUTOMATIC BREWER

[75] Inventors: Arthur H. Bunn, Springfield; James H. Anson, Auburn; David F. Ford, Springfield, all of Ill.

[73] Assignee: Bunn-O-Matic Corporation, Springfield, Ill.

[21] Appl. No.: 683,285

[22] Filed: Apr. 10, 1991

[51] Int. Cl.⁵ .......................... A47J 31/06; A47J 31/00
[52] U.S. Cl. ..................................... 99/289 R; 99/300; 210/499
[58] Field of Search ................. 99/279, 280, 281, 282, 99/283, 289 R, 290, 300, 316, 295, 289 D; 210/499; 426/433

[56] References Cited

U.S. PATENT DOCUMENTS

| | | | |
|---|---|---|---|
| 3,288,049 | 11/1966 | Schmid et al. | 99/289 |
| 3,683,790 | 8/1972 | Black et al. | 99/289 |
| 4,579,049 | 4/1986 | Rodrigues | 99/289 |
| 4,633,771 | 1/1987 | Anderl | 99/280 |
| 4,651,632 | 3/1987 | Motsch | 99/289 R |
| 4,694,737 | 9/1987 | Wittlinger | 99/279 |
| 4,703,686 | 11/1987 | Siegfried | 99/279 |

Primary Examiner—Robert W. Jenkins
Attorney, Agent, or Firm—Trexler, Bushnell, Giangiorgi & Blackstone, Ltd.

[57] ABSTRACT

An automatic beverage brewing apparatus which includes: a brew chamber assembly; a piston assembly projecting through the brew chamber assembly; a drive apparatus attached to the piston assembly for moving the piston assembly through the brew chamber; and a water distribution system for distributing brew water and flush water to the brew chamber assembly. The piston assembly can be controllably axially displaced and rotated. The piston assembly includes: a generally elongated spool member and an elongated shank portion connected to the spool member; a central axis extending coaxially through both the spool member and the shank portion; a flush water bore extending through the spool member and the shank portion generally coaxial with the central axis. A throat is formed through a top end of the brew chamber and a drain hole formed in a bottom end of the brew chamber. The piston assembly is positioned inside of the brew chamber assembly and is capable of releasably sealing both the throat and the drain by being axially moved through the brew chamber. A spray nozzle is attached to the spool member and receives water from the flush water bore for rinsing the inside of the brew chamber.

34 Claims, 4 Drawing Sheets

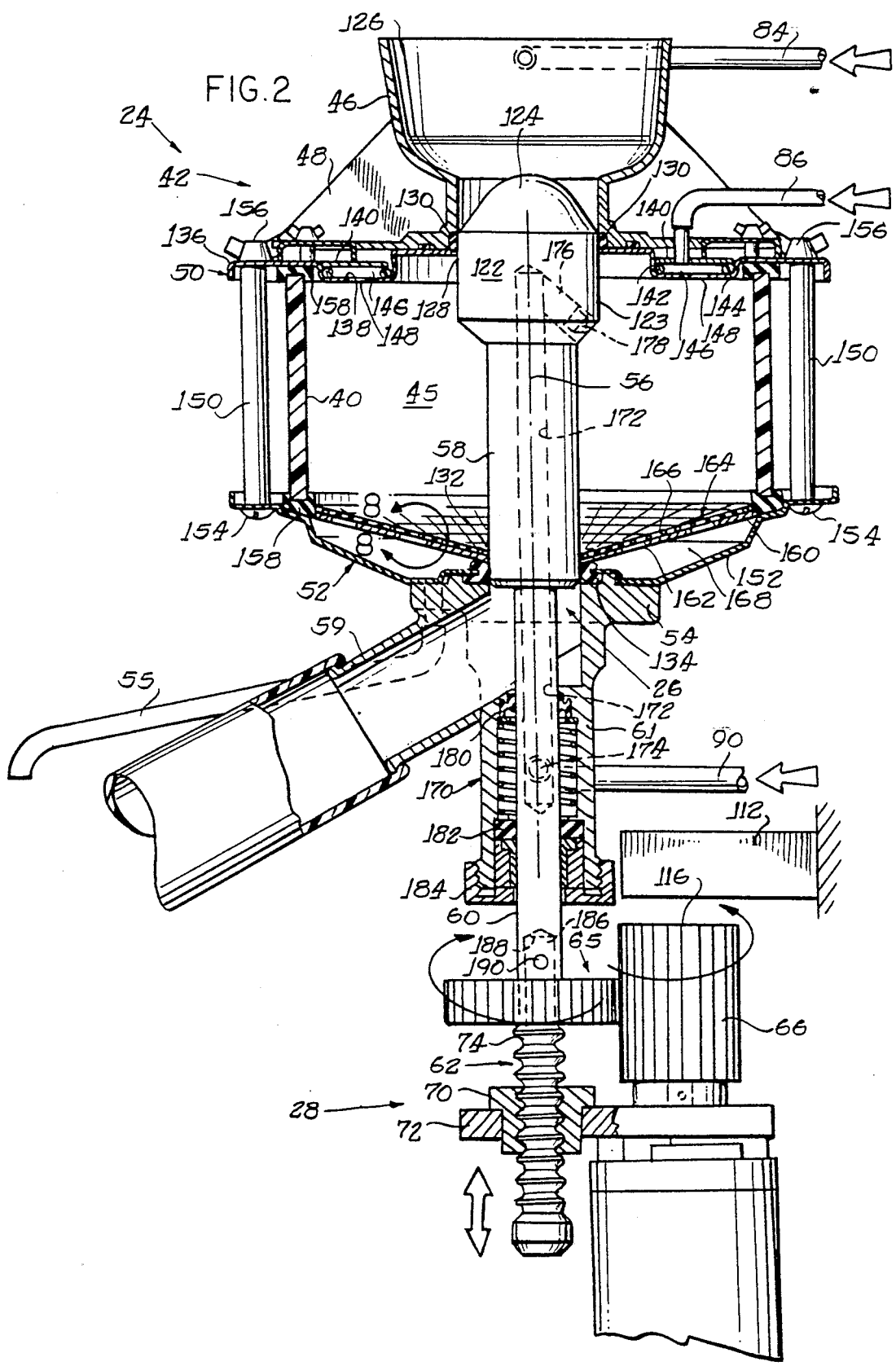

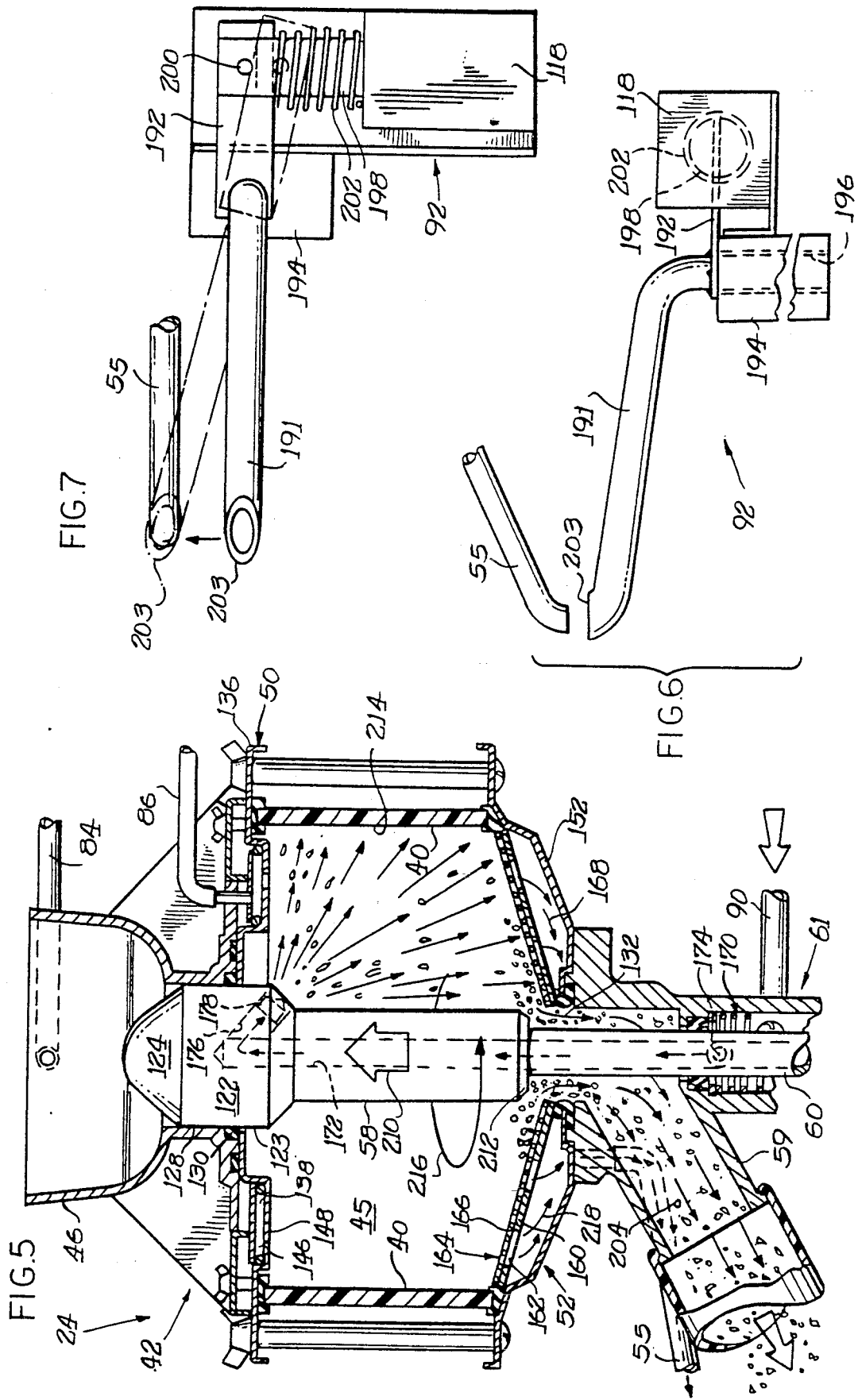

AUTOMATIC BREWER

BACKGROUND AND SUMMARY OF THE INVENTION

This invention relates generally to a beverage brewing device which automates many of the steps involved in brewing a beverage.

Automatic coffee brewing devices are known in the art but have not overcome problems associated with automatic brewers. For example, U.S. Pat. No. 4,633,771 to Anderl shows an automatic coffee brewing device which incorporates a movable piston to regulate the coffee brewing cycle. The piston as shown in Anderl is axially moved by a rod which is driven by a motor. The rod advances or retreats based on its engagement with a rotating cam disk. A problem arises with the device of Anderl in that the notches in the cam disc are prone to cause improper brewing if they become coated or clogged with foreign matter. Foreign matter is likely to accumulate on the disc because of the environment in which it operates which includes ground coffee fines and chaff and high humidity due to the coffee-brewing operation.

Another problem with the device as shown in Anderl is that it is difficult to keep the coffee-brewing chamber clean and to exhaust spent coffee grounds. Anderl shows only a single spray head which proves inefficient and unthorough in flushing spent coffee grounds from the brew chamber.

Another automatic brewing device is shown in U.S. Pat. No. 4,694,737 to Wittlinger. The device as shown in Wittlinger is similar in its operation to the device in Anderl but does not provide improvements resolving the problems of Anderl. Rather, the device in Wittlinger shows improvements to the filtering assembly as used in the brew chamber. The filter shown in Wittlinger specifically uses a stainless steel material which is etched to form small diameter micro-perforations therethrough. With reference to FIG. 4, the micro-perforations etched through the stainless steel sheet material increase in diameter from the upper surface of the sheet as measured towards the bottom surface of the sheet. In other words, when viewed cross-sectionally as shown in FIG. 4, the micro-perforations form inverted cone or funnel shapes.

The device as shown in Wittlinger has a problem with the stainless steel sheet material in that the micro-perforations are formed overlying a rigid supporting member therebelow. With further reference to FIG. 4, the generally thin stainless steel sheet lays on top of a substantially thicker supporting member. The supporting member provides structural support to support the weight of the coffee grounds and brewing water saturated therein during a brewing cycle. However, the micro-perforations which are out of register with the large diameter holes formed through the supporting member tend to clog with soluble sediments and other matter due to the inverted funnel shape. Such clogging is prone to unsanitary developments which may affect the taste and the quality of the beverage brewed therein. Further, the top edges of the micro-perforations tend to catch particulate matter when the grounds are exhausted from the brew chamber by a spray of flush water. Thus, the device in Wittlinger retains some particulate matter from the previous brewing cycle.

One alternative to the micro-perforation material shown in Wittlinger is a woven material with extremely fine threads forming extremely fine perforations therebetween. However, the woven pattern, similar to the micro-perforations as shown in Wittlinger, tend to catch particulate matter and harbor sediment and other matter in the intersections between the woven threads. Therefore, woven material does not overcome the problems of the filter material as shown in Wittlinger.

Heretofore, no known device has overcome the problems as discussed hereinabove.

OBJECTS AND SUMMARY OF THE INVENTION

A general object of the present invention is to provide an automatic beverage brewing device which thoroughly and efficiently removes spent beverage brewing substances from a brew chamber at the completion of a brewing cycle.

Another object of the present invention is to provide a beverage brewing apparatus for automatically brewing beverages which includes a rinsing system for rinsing a beverage brewing substance receiving funnel to assure complete use of the beverage brewing substance and thorough cleaning of the components of the beverage brewing apparatus.

Another object of the present invention is to provide a beverage brewing apparatus for automatically brewing beverages which generally evenly distributes brew water over a beverage brewing substance to more thoroughly and efficiently extract a brewed beverage therefrom.

Yet another object of the present invention is to provide a beverage brewing apparatus for automatically brewing beverages which thoroughly removes spent beverage brewing substance from a brew chamber by employing a spray head mounted in a spool member extending through the brew chamber thereby thoroughly removing spent brewing substance from all parts of the brew chamber.

Still a further object of the present invention is to provide a beverage brewing apparatus for automatically brewing beverages which include a rotatable piston and a spray head mounted thereon for rotatably spraying and removing beverage brewing substances from the brew chamber.

A further object of the present invention is to provide a beverage brewing apparatus for automatically brewing beverages including a drive assembly which actually displaces and rotates the piston member through the brew chamber.

Briefly, and in accordance with the foregoing, the present invention comprises an automatic brewing apparatus for automatically brewing beverages such as coffee. The beverage brewing apparatus includes: a brew chamber assembly; a piston assembly projecting through the brew chamber assembly; a drive apparatus attached to the piston assembly for selectively moving the piston assembly through the brew chamber; and a water distribution system for distributing brew water and flush water to the brew chamber assembly. The piston assembly can be controllably axially displaced and rotated. The piston assembly includes: a generally elongated spool member and an elongated shank portion connected to the spool member; a central axis extending coaxially through both the spool member and the shank portion; a flush water bore extending through the spool member and the shank portion generally coaxial with the central axis. A throat is formed through a top end of the brew chamber and a drain hole formed in a bottom end of the brew chamber. The piston assembly positioned inside of the brew chamber assembly controllably releasably seals both the throat and the drain by being axially moved through the brew chamber. A spray nozzle is attached to the spool member and receives water from the flush water bore for rinsing the inside of the brew chamber.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements in which:

FIG. 2 is a partial cross sectional view of a brew chamber assembly of the beverage brewing apparatus in which the brew chamber assembly has been slightly rotated to more clearly show the components thereof;

FIG. 5 is a partial cross sectional view of the brew chamber assembly after the piston assembly has been upwardly axially displaced and illustrating rotary movement of the piston assembly spraying the inside of the brew chamber to exhaust spent coffee grounds;

FIG. 6 is a side elevational view of a diverter tube assembly; FIG. 7 is a plan view of the diverter tube as shown in FIG. 6.

DETAILED DESCRIPTION OF THE PREFERRED EMBODIMENT

Figure 1:
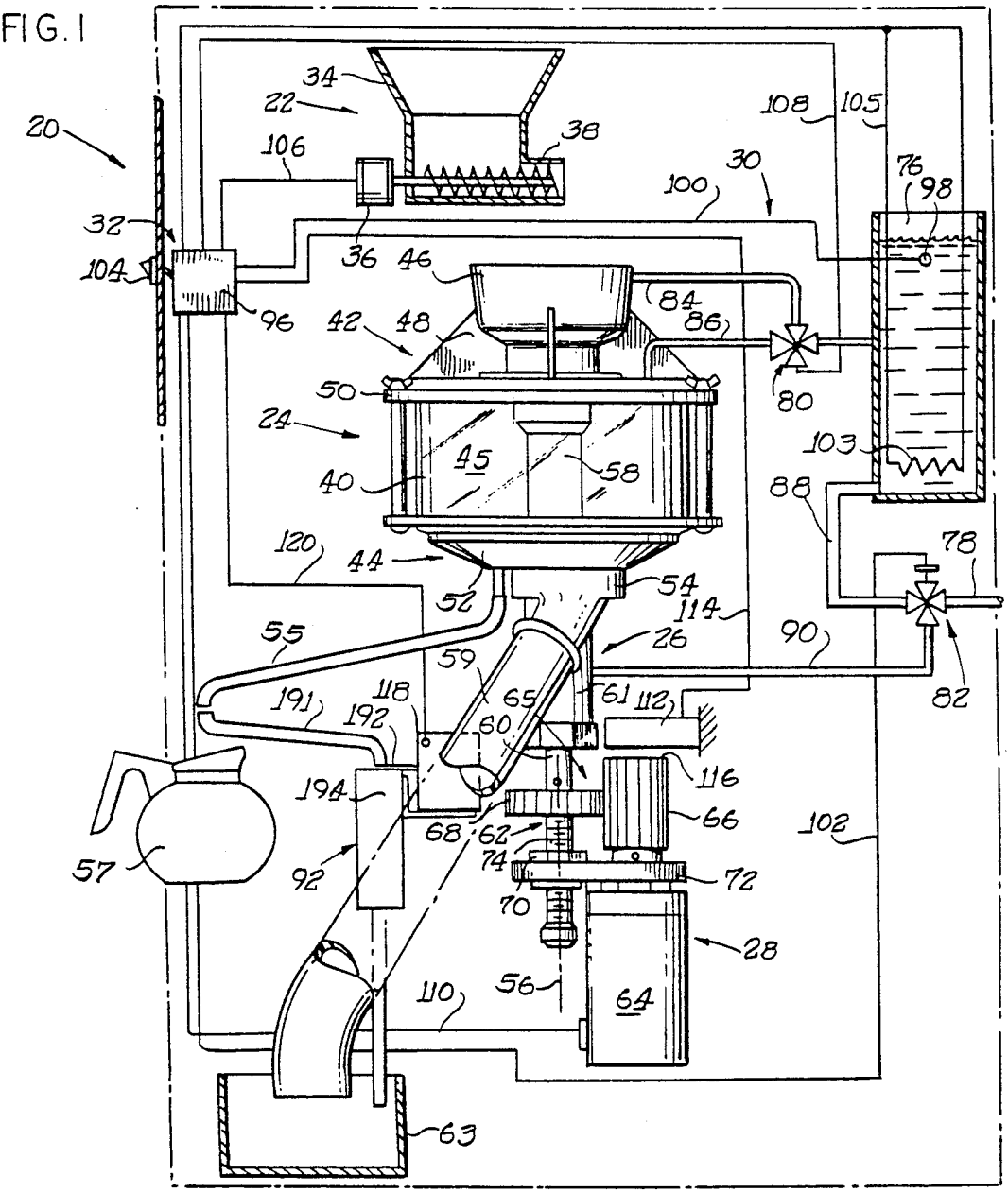
FIG. 1 is a diagrammatic illustration of a beverage brewing apparatus of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring now to the drawings, wherein like parts are designated by the same reference numerals throughout the figures, an automatic beverage brewing apparatus or brewer 20 is diagrammatically illustrated in FIG. 1. The brewer includes a coffee hopper 22, a brew chamber assembly 24, a piston assembly 26 (as better shown in FIGS. 2-5), a drive apparatus 28, a water distribution system 30 and a control system 32.

As shown in FIG. 1, the coffee hopper 22 includes a hopper container 34 and a motor 36 driven auger 38 retained therein. A brewing substance such as coffee is disposed inside of the hopper container 34 and stored therein for future delivery to the brew chamber assembly 24. While the word "coffee" is used herein with regard to the beverage brewing substance, it should be clear that brewing substances other than coffee may be used in the present invention. Further, although a hopper 22 is shown a grinding apparatus (not shown) may be employed to deliver a predetermined quantity of freshly ground coffee or other beverage brewing substance to the brew chamber assembly.

The brew chamber assembly 24 includes a housing member 40 which is retained between a chamber top assembly 42 and a chamber bottom assembly 44. The housing member 40 is a generally cylindrical member formed of a suitable material to withstand the temperature, moisture and other conditions present during the brewing process. As shown herein, the housing member is formed of a suitable transparent material such as glass to permit inspection of the brew chamber assembly 24 without disassembly thereof. As can be seen in FIG. 1, the piston assembly 26 projects upwardly through the chamber bottom assembly 44, the housing member 40, and the chamber top assembly 42. A brew chamber 45 is formed inside of the housing member 40 when the top and bottom chamber assemblies 42, 44 are attached thereto.

A funnel portion 46 is mounted on the uppermost portion of the chamber top assembly 42 and is reinforced by support members 48 extending from the sides thereof. A spray manifold assembly 50 is positioned between the funnel portion and the housing member 40.

The chamber bottom assembly 44 includes a filter assembly 52 and a drain body 54. The filter assembly 52 supports a beverage brewing substance disposed in the brew chamber 45 during the brew process. A serving tube 55 extends from the filter assembly 52 to deliver a brewed beverage collected therefrom to a container 57. The drain body 54 permits spent brewing substance to be exhausted from the brew chamber assembly 24 though an exhaust tube 59 attached thereto at the conclusion of the brewing process and includes a piston housing 61 through which the piston assembly 26 projects. Spent grounds transported though the exhaust tube 59 are deposited in a collection hopper 63 therebelow.

As indicated above, the piston assembly 26 projects upwardly through the bottom of the brew chamber assembly 24 along a central axis 56 extending therethrough. Included in the piston assembly 26 is a spool portion 58 generally positioned inside of the housing member 40, and a shank portion 60 attached to and extending downwardly from the spool portion 58.

The drive apparatus 28 includes a lead screw 62 which attaches to the shank portion 60 of the piston assembly 26 to operatively connect the drive apparatus 28 with the piston assembly 26. A motor 64 associated with the drive apparatus 28 moves driving means 65 to rotate and axially displace the lead screw 62 and the attached piston assembly The motor 64 is preferably a DC motor which may be reversed to reverse the direction of rotation and travel of the piston assembly 26.

While various forms of driving means 65 may be employed to drive the lead screw 62, the driving means 65 as illustrated includes a drive gear 66 engaged with an operating gear 68, both of these gears 66, 68 being cooperatively mating spur gears, and an acme nut 70 attached to a fixed mounting member 72. Fixing the acme nut 70 to the mounting member 72 retains the acme nut 70 in a fixed position relative to the drive gear 66 to produce movement in the lead screw 62. Threads 74 of the lead screw 62 cooperatively engage threads formed on the inside of the acme nut 70. The operating gear 68 is nonrotatably fixed to the lead screw 62 so that when the drive gear 66 is rotated the operating gear 68 is rotated thereby rotating the lead screw 62. As the lead screw 62 is rotated, it threadedly moves through the acme nut 70 resulting in axial displacement of the piston assembly 26 through the brew chamber assembly 24. Further, since the operating gear 68 is fixed to the lead screw 62 the piston assembly 26 also rotates as it is axially displaced through the brew chamber assembly 24.

A heated water reservoir 76 and a cold water inlet line 78 supply water to the water distribution system 30. Water flowing from both the heated water reservoir 76 and the cold water inlet line 78 are controlled by a respective hot water valve 80 and a cold water valve 82. The hot water valve 80 controls water to a rinse water line 84 and a brew line 86. The rinse water line 84 emits a controlled amount of water to the funnel portion 46 to rinse any beverage brewing substance from the inside of the funnel and into the brew chamber. The brew water line 86 provides brew water to the spray manifold assembly 50 which then distributes the brew water over the beverage brewing substance.

The cold water valve 82 controls flow through the fill water line 88 and a flush water line 90. Water is introduced into the heated water reservoir 76 through the fill water line 88. The flush water line 90 supplies water to the piston assembly 26 which thereby introduces water into the brew chamber 45 to flush spent beverage brewing substance from the brew chamber 45.

A waste water diverter assembly 92 is also included in the water distribution system 30. The waste water diverter assembly 92 is employed during the flush cycle to remove spent beverage brewing substance from the brew chamber 45. During the flushing cycle, a small quantity of flush water will flow through the serving tube 55 and therefore must be collected to avoid introduction into the container 57. Water collected by the waste water diverter assembly 92 is deposited in the collection hopper 63 with the material deposited therein by the exhaust tube 59. The waste water diverter assembly 92 will be discussed in greater detail hereinbelow with reference to FIGS. 5-7.

The automatic beverage brewer 20 is controlled by the control system 32. The control system 32 includes a central controller 96 which coordinates control signals between it and the components of the brewer 20 over numerous control lines. The control lines are shown diagrammatically as single lines but may include multi-wire lines depending on the requirements of the particular component. While the apparatus, as disclosed herein, is to brew and deliver a half gallon or gallon of beverage at a time, it is to be understood that the controller 96 may be adjusted to deliver a larger or smaller quantity of beverage to a carafe or other container, not shown, from which the beverage can be subsequently dispensed.

A heated water level sensor 98 signals the central controller 96 over control line 100 to indicate the water level of the heated water reservoir 76. When the heated water reservoir 76 reaches a predetermined level and water level sensor 98 signals the central controller 96. The controller 96 then sends a signal to the cold water control valve 82 over control line 102 to open the cold water control valve 82. The heated water reservoir also includes a thermostatically controlled heating element 103 which is controlled over control line 105.

When operation of the brewer 20 is activated by switch means 104 the central controller 96 activates the motor 36 through control line 106 to measure out a predetermined amount of beverage brewing substance from the coffee hopper 22 into the funnel portion 46. After a predetermined amount of beverage brewing substance has been disposed into the funnel portion 46, the central controller 96 activates the hot water control valve 80 over control line 108 to introduce rinse water through the rinse water line 84 into the funnel portion 46. Likewise, the controller 96 also controls the hot water valve 80 over control line 108 to introduce brew water into the brew chamber 45 through the brew line 86.

The drive apparatus 28 is also controlled by the central controller 96 by means of a power control line 110 and a Hall effect sensor 112 (shown diagramatically) connected to the central controller 96 by control line 114. Movement of the components of the drive apparatus 28 are regulated by signals generated by the Hall effect sensor 112 which detects the movement of magnets mounted in a top surface 116 of the drive gear 66. Signals from the Hall effect sensor 112 are relayed to the central controller 96 by control line 114. Finally, the central controller 96 also controls the waste water diverter assembly 92 by controlling a solenoid 118 connected to control line 120.

Turning now to FIG. 2, a cross-sectional view of the brew chamber assembly 24 is illustrated. The view of the brew chamber assembly 24 as illustrated in FIG. 2 is similar to that as illustrated in FIG. 1, however, the brew chamber assembly 24 has been rotated slightly in order to more clearly describe the operation of the piston assembly 26 and its components.

The piston assembly 26 includes the spool portion 58 and the shank portion 60. As shown, the spool portion 58 has an enlarged diameter head 122 which terminates in a domed surface 124. A mouth 126 of the funnel 46 tapers down into a throat 128 which is releasably sealed by an axially extending cylindrical side surface 123 of the enlarged diameter head 122 of the spool 58 projecting therethrough against a gasket 130 retained therein. At the bottom end of the brew chamber assembly a drain hole 132 is formed through the filter assembly 52 and communicates with the drain body 54. The drain hole 132 has a diameter less than the diameter of the throat 128 and is releasably sealed by the reduced diameter portion of the spool 58 when the spool 58 of the piston assembly 26 projects therethrough against a gasket 134 retained between the filter assembly 52 and the drain body 54.

As shown in the cross section of FIG. 2, the spray manifold assembly 50 includes a circular manifold plate 136 in which is formed a distribution channel 138 and a channel covering ring 140 which sealably covers the distribution channel 138 with an inside and an outside O-ring 142, 144, respectively. A gap 146 is formed between the channel cover ring 140 and the bottom of the distribution channel 138. The brew line 86 extends through the channel cover ring 140 and communicates with the gap 146 to distribute water throughout the distribution channel 138. Water is distributed over the beverage brewing substance through a series of manifold apertures 148 formed through the distribution channel 138. As will be seen in FIG. 4, water flowing through the manifold apertures 148 is distributed generally evenly over the surface of the beverage brewing substance retained in the brew chamber assembly 24 to maximize the infusion of such substance.

Rod members 150 extend between the manifold plate 136 and a basket member 152 of the filter assembly 52. The rod members 150 have a head 154 at one end and threadedly engage a wingnut 156 at the other end. This arrangement sealably clamps the housing member 40 between the manifold plate 136 and the basket member 152. A seal is effected by sealing members 158 positioned between edges of the housing member 40 and corresponding surfaces of the manifold plate and the basket member 152.

A structural sieve 160 is cooperatively retained in the basket member 152 of the filter assembly 52 for supporting an overlying cover filter material 164. Perforations 162 are formed through the structural sieve 160 to permit fluids to pass therethrough. Pores 166 extending through the filter material 164 permit fluid to pass therethrough and subsequently through the perforations 162 formed through the structural sieve 160. It should be noted that the perforations 162 and the pores 166 shown in FIGS. 2-5 have been exaggerated for illustrative purposes. Fluid which passes through the filter material 164 and the structural sieve 160 collects in a collection space 168 formed between the structural sieve 160 and the basket member 152. Fluid collected therein flows into the serving tube 55 and into an appropriate collection container 57. Further detail will be provided with regard to the structural sieve 160 and the cover filter member 164 with reference to FIGS. 8-10 discussed herein below.

A "Y"-intersection is formed in the drain body between the exhaust tube 59 and the piston housing 61. The downwardly oriented direction of the exhaust tube 59 promotes the flow of spent brewing substance out of the brew chamber after a brewing cycle has been completed. The shank portion 60 of the piston assembly passes through a sealed chamber 170 in the piston housing 61. The sealed chamber 170 is sealed at a top end and a bottom end.

The sealed chamber 170 forms a displaceable coupling with the flush water line 90 to permit water to flow from the flush water line through a flush water bore 172 formed generally coaxial with the central axis 56 extending through the piston assembly 26. Flush water flowing from the flush water line 90 flows into the sealed chamber 170 and through an inlet aperture 174. Water flows through the flush water bore 172 upwardly towards the enlarged head 122 and is forced through a downwardly directed port 176 formed on an underside of the enlarged head 122 and out through a nozzle 178 attached to the end of the port 176. A top gasket and a bottom gasket 180, 182, respectively form a seal between the sealed chamber 170 and the shank portion 60 and prevent leaking while the piston assembly 26 is rotated and axially displaced by the drive apparatus 28. A bottom portion of the piston housing 61 is sealed by a cap member 184 threadedly retained thereon.

FIG. 2 provides further detail as to the configuration and operation of the drive apparatus 28. As shown, the lead screw 62 has a male portion 186 which couples with a recess 188 formed in the end of the shank portion 60. A pin 190 projecting therethrough retains the lead screw 62 in engagement with the shank portion 60. The lead screw 62 threadedly engages the acme nut 70 which is securely retained on the mounting member 72.

FIGS. 6 and 7 provide illustrations of the waste water diverter assembly 92 as mentioned hereinabove. As shown in FIG. 6, an angled diverter tube 191 is positionable below the serving tube 55 for receiving waste water flowing therefrom. The diverter tube 191 is angled and securely attached to a pivot arm 192 and extends downwardly into a pivot block 194. A portion of the diverter tube 191 extending through the pivot block 194 freely rotates within a bore 196 formed through the pivot block 194.

As shown in the plan view in FIG. 7, the pivot arm 192 is attached to to a shaft member 198 by means of a pivot pin 200. The shaft member has a spring 202 retained between the pivot arm and the solenoid 118. When the solenoid 118 is activated the shaft member 198 is retracted thereby moving the pivot arm 192 and pivoting the diverter tube 191 attached thereto to position a receiving end 203 into position underneath the serving tube 55 (as shown in phantom line). Once the solenoid 118 releases the shaft member 198, the spring returns the pivot arm 192 to the original position.

Figure 3:
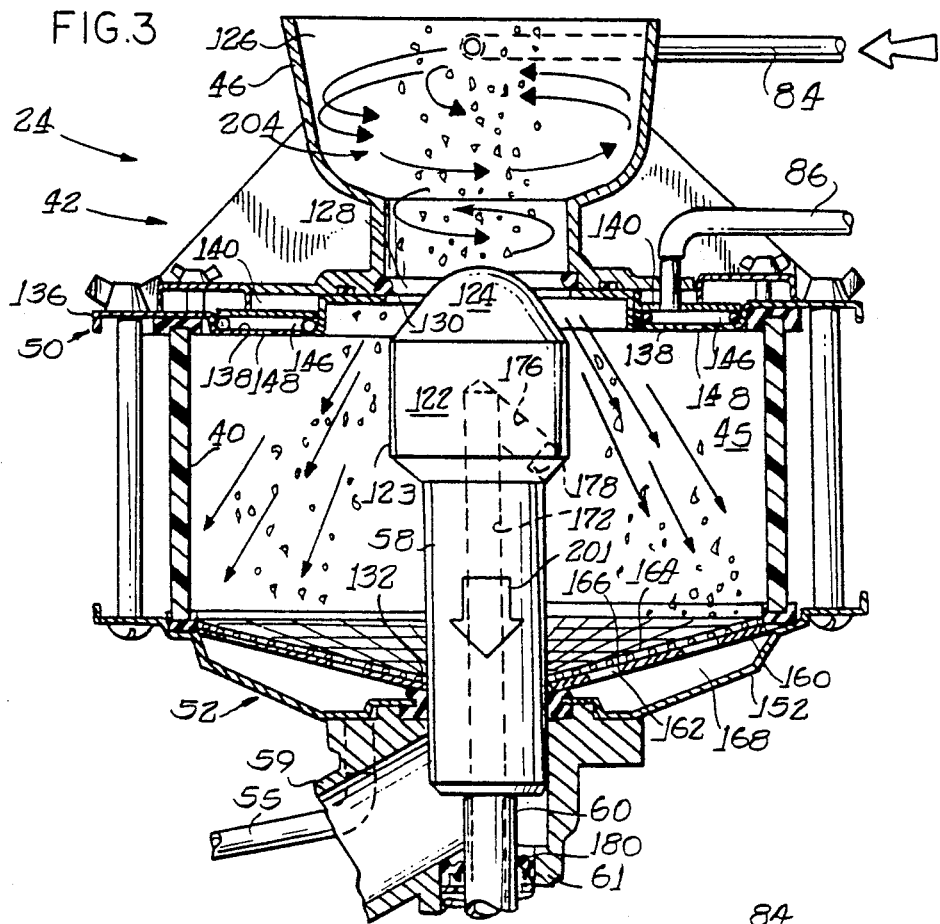
FIG. 3 is a partial cross sectional view of the brew chamber assembly as illustrated in FIG. 2 after a piston assembly projecting therethrough is downwardly axially displaced and illustrating coffee grounds being disposed therein through a funnel member and rinse water being introduced to clean the funnel and wash the grounds into the brew chamber.
Figure 4:
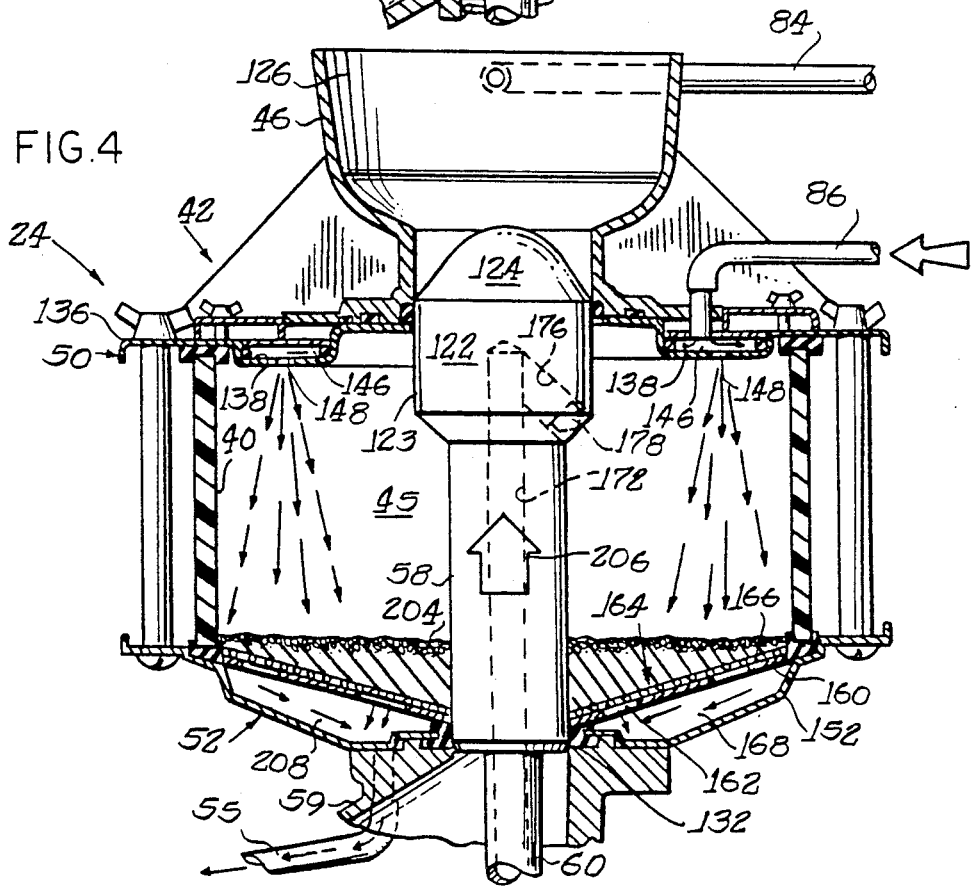
FIG. 4 is a partial cross sectional view of the brew chamber assembly after the piston assembly has been axially displaced to seal the bottom drain hole and illustrating brew water flowing into the brew chamber for infusing the coffee grounds disposed therein.

Referring now to FIGS. 3-5, the operation of the present invention during the brewing process is discussed. As shown in FIG. 3, upon activation of the brewer 20 the spool portion 58 is downwardly displaced (as indicated by arrow 201) to open the throat 128 and permit a quantity of beverage brewing substance (as indicated by particles 204) to be disposed into the funnel portion 46 and pass into the brew chamber 45. A quantity of rinse water is introduced through the rinse water line 84 to flush the particles 204 out of the funnel portion 46 and down through the throat 128 into the brew chamber 45. Further, the rinse water removes particles from the enlarged head portion 122 and the domed surface 124 thereby providing a better seal between the gasket 130 and the enlarged head portion 122 when the spool 58 is upwardly displaced. The rinse water and the beverage brewing substance 204 collect in the funnel assembly 52 on the covering filter member 164.

As shown in FIG. 4, the spool 58 is moved upwardly (as indicated by arrow 206) to seal the throat 128 formed through the chamber top assembly 42. Note also, that the drain hole 132 formed through the chamber of bottom assembly 44 is sealed by the spool portion 58 at this point in the brew cycle. With the spool portion 58 sealing the brew chamber at the top and bottom, brew water is introduced through the brew water line 86 and flows through the gap 146 formed between the distribution channel 138 and the channel cover ring 140. Brew water flows through the gap 146 and is dispersed over the beverage brewing substance 204 upon flowing through the plurality of annularly arranged manifold apertures 148 formed through the distribution channel 138. The circle of manifold apertures 148 generally evenly distribute the brew water thereby assuring that all of the beverage brewing substance is thoroughly infused with brewing water to maximize the efficiency of the brewing operation.

Once the beverage brewing substance is infused, a brewed beverage (as indicated by arrows 208) flows through the pores 166 formed through the cover filter material 164 and through the perforations 162 formed through the structural sieve 160. The brewed beverage collects in the collection space 168 and flows into the serving tube 55.

After the brewing process is completed, the next step is to flush the brew chamber 45 with water to remove the spent beverage brewing substance 204 therefrom.

As shown in FIG. 5, the spool 58 is moved upwardly (as indicated by arrow 210) moving the enlarged head portion 122 upwardly through the throat 128 thereby disengaging a lower portion 212 of the spool 58 from the drain hole 132. Once the drain hole 132 is opened, water begins to flow through the flush water line 90 into the sealed chamber 170 and up through the flush water bore 172. When the water flows from the nozzle 178 the inside surface 214 of the housing member 40 is rinsed to remove beverage brewing substance and other matter therefrom. The nozzle 178 as used in the present invention provides at least a 90° spray angle so that the water flushes the top edge of the inside surface 214 of the housing member 40. Further, because the spool portion 58 rotates (as indicated by arrow 216) about the central axis 56, a single nozzle 178 may be employed to spray the entire brew chamber 45 during the flushing operation. It should be noted, however, that multiple nozzles may be used to further enhance the flushing operation.

The beverage brewing substance 204 is flushed through the exhaust tube 59 and into the collection hopper 63. A portion of the flushing water tends to filter through the cover filter member 164 and the structural sieve 160. Waste water as indicated by arrows 218 in FIG. 5 which flows through the filter assembly 52 flows into the serving tube 55. Because it would be highly undesirable to have waste water flowing into the freshly brewed beverage or into the collection container area, the waste water diverter assembly 92 provides a means to collect waste water diverted into the collection hopper 63. Operation of the waste water diverter assembly 92 has been discussed hereinabove.

At the completion of the flushing cycle, the lower portion 212 of the spool portion 58 is sealably seated in the drain hole 132. The spool 58 is axially displaced as well as rotated during the flushing cycle because of the thread arrangement on the lead screw 62. The lead screw 62 and the acme nut 70 are essentially self cleaning and therefore this arrangement is not susceptible to build up of foreign matter as does the prior art. Further, it should be noted that the drive apparatus may be controlled to oscillate the piston assembly through more than one flushing cycle. In other words, the piston assembly may be axially displaced and rotated through the brew chamber assembly multiple times during one flush cycle to increase the thoroughness of the flush cycle.

While the threads may be produced over a wide range of spacing to produce a wide range of rotation to axial displacement relationships, a preferred thread arrangement produces approximately 1/10" of axial displacement for each rotation of the spool 58. Such a relationship will provide a thorough flushing cycle for an appropriately sized brew chamber 45 within a 10–15 second interval. This range is believed to provide a sufficient rotary flushing of the brew chamber 45 in a sufficiently short period of time for feasible automatic beverage brewing.

Figure 8:
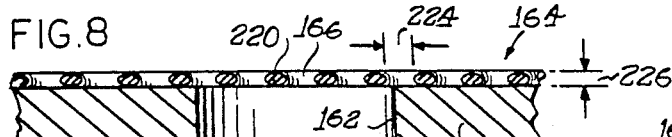
FIG. 8 is an enlarged cross sectional view of the filter assembly as indicated in FIG. 2.
Figure 9:
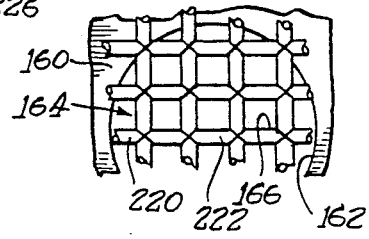
FIG. 9 is a plan view of the filter assembly as shown in FIG. 8.

FIGS. 8 and 9 provide a detailed cross-section and plan view of the cover filter material 164 positioned on top of the structural sieve 160. With reference to both FIGS. 8 and 9, the cover filter material 164 is formed by numerous intersecting lattice crossmembers 220 which intersect in an abutting arrangement 222 to form a lattice structure. The lattice crossmembers form square pores 166 throughwhich fluid may flow. As shown in the cross-section of FIG. 8, the lattice crossmembers 220 have a generally oval cross-sectional shape. The oval shape minimizes retention of particles moving thereacross and enhances the free flow of fluid therebetween. The oval shape results in pores 166 which have a minimum dimension 224 measured at approximately the center of the thickness 226 of the cover filter material 164. As such, the pores 166 open upwardly and downwardly from the center 226 of the cover filter material 164.

Figure 10:
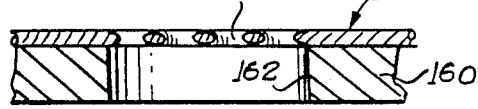
FIG. 10 is an enlarged cross sectional view of an alternative embodiment of the filter assembly.

FIG. 10 provides an alternate embodiment of the cover filter material 164a in which the cover filter material 164a has been formed with pores 166a in a pattern which registers with the perforations 162 formed through the structural sieve 160. This arrangement prevents the possibility of any accumulation in the "dead areas" where the cover filter material 164 overlies a surface of the structural sieve 160 and where there are no perforations 162 to drain the pores 166.

The cover filter member 164 forms a non-woven fine mesh material. Since the material is not woven, there are no overlapping crossmembers to catch sedimentation or accumulate other matter. The cover filter material 164 as used in the present invention is formed of a metal which is electrically deposited on a patterned substrate from a solution containing a desired metal. The mesh may range from approximately 5 to 2,000 lines per inch as required for a particular beverage brewing substance. Such material is produced by the Buckbee-Mears Company in St. Paul, Minn. The construction of the filter assembly 52 of the present invention promotes thorough removal of beverage brewing substances from the brew chamber 45 by the spray nozzle 178 in the spool 58 thereby eliminating the need for manual cleaning.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

What is claimed is:

1. A beverage brewing apparatus for automatically brewing beverages comprising: a brew chamber assembly, including a top assembly and a bottom assembly, an inlet throat through said top assembly, a drain hole through said bottom assembly and axially aligned with said throat, a piston assembly axially and rotatably shiftable between loading, brewing, and flushing operations, respectively sealing said drain hole while opening said throat, sealing both said throat and said drain hole, and sealing said throat while opening said drain hole; means for introducing a brew substance through said throat when the throat is open; means for introducing brew water into said brew chamber assembly when both the throat and drain hole are sealed; means for introducing flush water through said piston and into said chamber; drive means for axially shifting said piston between said positions and for rotating said piston; a filter assembly disposed in the lower portion of said brew chamber for separating the brew substance from brewed beverage; means for directing brewed beverage from the chamber to a discharge point for delivery to a container, said means for directing brewed beverage also delivering a portion of flush water during flushing of said brew chamber assembly.

2. A beverage brewing apparatus according to claim 1, wherein said piston includes a relatively large diameter upper end portion for sealing said throat and a relatively small diameter lower end portion for sealing the drain hole, the diameter of the throat being greater than the diameter of the drain hole; and said means for introducing flush water includes a discharge port on said piston and extending downwardly and outwardly from beneath said upper end portion.

3. A beverage brewing apparatus according to claim 1 wherein said means for delivering brew water comprises an annular manifold in said top assembly and a series of spaced apertures around said manifold for promoting even distribution of water into and around said chamber.

4. A beverage brewing apparatus according to claim 1 wherein said filter assembly comprises a lattice of intersecting cross members defining pores therebetween, said cross members including metal deposited on a patterned substrate, said cross members having a generally oval cross-section.

5. A beverage brewing apparatus according to claim 1 further including flush water diverting means comprising a drain element shiftable to and from positions in alignment with, and offset from, the discharge point.

6. A beverage brewing apparatus according to claim 5 which includes control means comprising solenoid valves, respectively controlling the brew water and the flush water, a motor for said brew substance delivery means, a motor for said drive means, an electrical actuator for said flush water diverting means, and a central controller electrically connected with said solenoid valve, said motor, and said actuator.

7. A beverage brewing apparatus for automatically brewing beverages, said beverage brewing apparatus including: a brew chamber assembly, a throat through a top end of said brew chamber assembly and a drain hole in a bottom end of said brew chamber assembly, a piston assembly operatively projecting through said brew chamber assembly for selectively sealing said throat and drain hole, a drive apparatus operatively attached to said piston assembly for axially and rotatably moving said piston assembly relative to said brew chamber; and a water distribution system for selectively distributing brew water and flush water to the brew chamber assembly, a flush water bore at least partially extend through said piston assembly, at least one spray port associated with said piston assembly in communication with said flush water bore for controllably rinsing the inside of said brew chamber assembly.

8. A beverage brewing apparatus according to claim 7 wherein said drive apparatus includes a motor, a threaded lead screw engaged at one end with said piston assembly, and driving means operatively associated with said motor and said lead screw for controllably moving said lead screw and said piston assembly engaged therewith.

9. A drive apparatus according to claim 8 wherein said driving means includes a threaded nut fixably positioned relative to said motor and threadedly engaged with said lead screw, said lead screw being fixably attached to said piston assembly, said motor imparting driving forces to said lead screw through said driving means for simultaneously rotating and axially displacing said piston assembly through said brew chamber assembly.

10. A drive apparatus according to claim 8 wherein said driving means includes a drive gear attached to and driven by said motor and an operating gear engaged with and driven by said drive gear, one of said drive and operating gears having a length dimension as long as a desired length of axial movement of the piston.

11. A beverage brewing apparatus according to claim 7 further including an enlarged diameter head portion formed on a top end of said spool, said enlarged diameter head portion extending beyond said port for shielding said port when said piston moves through said brew chamber.

12. A beverage brewing apparatus according to claim 7 wherein a top end of said piston assembly selectively seals said throat, a funnel member is attached to the top of said brew chamber in communication said throat for directing ground material into said brew chamber.

13. A beverage brewing apparatus according to claim 12 wherein said water distribution assembly further includes a rinse water line in communication with said funnel for rinsing particles from an internal surface of said funnel and said top end of said piston assembly when the piston assembly is positioned to open said throat, water flowing from said rinse water line flushing the particles into the brew chamber.

14. A filter assembly for use with a beverage brewing apparatus, said filter assembly receiving a quantity of brewing substance therein for infusion with water for extracting a brewed beverage therefrom, said filter assembly including a basket member, a support sieve, and a covering filter material overlying said support sieve; said support sieve being disposed in said basket member and said covering filter member being supported on said support sieve; a multiplicity of sieve perforations formed through said support sieve, said sieve perforations being sized and dimensioned for passing a brewed beverage therethrough; a multiplicity of cover pores formed through said covering filter material, said cover pores being sized and dimensioned smaller than said sieve perforations; an intersecting lattice structure of cross members forming said cover pores, lattice crossmembers intersecting one another generally at right angles, each lattice crossmember being generally cross sectionally oval for maximizing draining characteristics of said cover filter material; a gap formed between an inside surface of said basket and an outside surface of support sieve for collecting a brewed beverage draining through said cover filter member and said support sieve.

15. A filter assembly for use with a beverage brewing apparatus according to claim 14 wherein said cover filter material is formed by electrical deposition of metal on a patterned substrate, crossmembers of said patterned substrate intersecting at right angles to one another, metal deposited on said patterned substrate forming generally square pores.

16. A filter assembly for use with a beverage brewing apparatus according to claim 14 wherein said cover filter material is formed of a thin sheet material having a thickness dimension of approximately 4 to 60 microns and said crossmembers of said patterned substrate are spaced apart approximately 40 to 60 microns, said cover pores having a central dimension measured at the center of one of said cover pores and a surface dimension measured on either a top or a bottom surface of said cover filter material, said central dimension being smaller than said surface dimension at said top surface.

17. A drive apparatus in combination with an automatic beverage brewing apparatus which produces a brewed beverage during an automatic beverage brewing cycle, said automatic beverage brewing apparatus including a brew chamber assembly and a piston assembly operatively projecting through said brew chamber assembly; said drive apparatus being attached to said piston assembly for controllably displacing said piston assembly relative to said brew chamber assembly during automatic beverage brewing cycles; said drive apparatus including a motor, a threaded lead screw operatively connected with said piston assembly, and driving means operatively associated with said motor and said piston for rotating said piston, said lead screw controllably axially displacing said piston assembly during rotation of said piston assembly.

18. A drive apparatus according to claim 17 wherein said driving means includes a threaded nut fixably positioned relative to said motor and threadedly engaged with said lead screw, said lead screw being fixably attached to said piston assembly, said motor imparting driving forces to said lead screw through said driving means for simultaneously rotating and axially displacing said piston assembly through said brew chamber assembly.

19. A drive apparatus according to claim 18 wherein said driving means includes a drive gear attached to and driven by said motor and an operating gear attached to said lead screw, said operating gear being engaged with and driven by said drive gear, one of said drive and operating gears having a length dimension sufficiently long to permit axial travel of the other of said gears as said operating gear is axially displaced with said lead screw.

20. A drive apparatus according to claim 18 wherein said motor is a DC motor, said DC motor being reversible for reversing the direction of travel of the lead screw and reversing the direction of travel of the piston assembly thereattached.

21. A drive apparatus according to claim 18 further including a series of magnets attached to said drive gear and sensor means for sensing the position of said magnets on said drive gear in motion for controlling the displacement of said piston assembly operated by said motor.

22. A flow diverter assembly in combination with an automatic beverage brewer, said automatic beverage brewer including a beverage serving tube for dispensing brewed beverages, said flow diverter assembly selectively receiving and directing fluid flow from said beverage serving tube of said automatic beverage brewer; said flow diverter assembly including an angled diverter tube, a pivot arm attached to said angled diverter tube, a pivot member movably retaining a drain end of said angled diverter tube therein, a solenoid operated motor operatively attached to said pivot arm, a receiving end of said angled diverter tube being controllably positionable underneath said beverage serving tube; said solenoid operated motor controllably moving said pivot arm for moving said angled tube attached thereto in said pivot member for swinging said receiving end into and out of position underneath said beverage serving tube for diverting flow therefrom.

23. A beverage brewing apparatus for automatically brewing beverages, said beverage brewing apparatus comprising: a brew chamber assembly having a throat through a top end and a drain hole through a bottom end thereof; a piston member operatively projecting through said brew chamber assembly for selectively opening and sealing said throat and drain hole; a drive mechanism operatively associated with said piston member for axially and rotatably moving said piston member relative to said brew chamber assembly; a water distribution system for selectively distributing brew water and flush water to the brew chamber assembly; a flush water dispenser disposed centrally in said brew chamber assembly, said flush water dispenser emitting flush water in an outward direction from a central area of said brew chamber assembly for rinsing inside surfaces of said brew chamber assembly.

24. A beverage brewing apparatus according to claim 23, further including said flush water dispenser being rotatable within said brew chamber assembly.

25. A beverage brewing apparatus according to claim 23, further including said flush water dispenser being rotatable and axially displaceable within said brew chamber assembly.

26. A beverage brewing apparatus according to claim 23, wherein said flush water dispenser includes a flush water bore extending at least partially through said piston member and a water emitting port in said piston member communicating with said flush water bore for emitting flush water therefrom.

27. A beverage brewing apparatus according to claim 26, wherein said drive mechanism comprises: a motor; a threaded lead screw operatively associated with said piston member; and drive means operatively associated with said motor and said lead screw for axially shifting and rotating said piston member between positions in said brew chamber assembly.

28. A beverage brewing apparatus according to claim 27, wherein said driving means includes a threaded nut fixably positioned relative to said motor and threadedly engaged with said lead screw, said lead screw being fixably attached to said piston member, said motor imparting driving forces to said lead screw through said driving means for simultaneously rotating and axially displacing said piston member through said throat and drain of said brewing chamber assembly.

29. A drive apparatus according to claim 28, wherein said driving means includes a drive gear attached to and driven by said motor and an operating gear engaged with and driven by said drive gear, one of said drive and operating gears having a length dimension corresponding to a predetermined length of axial movement of said piston.

30. A beverage brewing apparatus for automatically brewing beverages, said beverage brewing apparatus comprising: a brew chamber having an inlet throat through a top portion of said brew chamber and a drain hole through a bottom portion of said brew chamber; a piston member operatively projecting through said brew chamber assembly and being shiftable between loading, brewing, and flushing positions for selectively opening and closing said inlet throat and said drain hole; a filter assembly including a lattice of intersecting cross members defining pores therebetween, said cross members including metal deposited on a patterned substrate, said cross members having a generally oval cross-section.

31. A beverage brewing apparatus for automatically brewing beverages, said beverage brewing apparatus comprising: a brew chamber assembly, including a top assembly having an inlet throat and a bottom assembly having a drain hole; a piston member operatively projecting through said drain hole and inlet throat of said brew chamber assembly and being shiftable between loading, brewing, and flushing positions for selectively opening and closing said inlet throat and said drain hole; an upper end of said piston member selectively opening and sealing said inlet throat; a funnel member positioned on said top assembly of said brew chamber assembly in communication said inlet throat for directing a brewing substance into said brew chamber; a water distribution assembly including a rinse water line in communication with said funnel member for rinsing particles from an internal surface of said funnel and said upper end of said piston member when the piston member is positioned to open said inlet throat, water flowing from said rinse water line flushing the particles into said brew chamber assembly.

32. A beverage brewing apparatus for automatically brewing beverages, said beverage brewing apparatus including: a brew chamber assembly having as throat through a first side of said brew chamber assembly and a drain hole through a second side of said brew chamber assembly, said first side and second side being spaced apart; a piston assembly operatively projecting through said brew chamber assembly for selectively opening and sealing said throat and drain hole; a drive mechanism operatively associated with said piston assembly for axially displacing and rotatably moving said piston assembly relative to said brew chamber assembly; and a water distribution system for selectively distributing brew water and flush water to said brew chamber assembly, said water distribution system having a flush water bore at least partially extending through said piston assembly and at least one exit port associated with said piston assembly in communication with said flush water bore for controllably rinsing inside surfaces of said brew chamber assembly.

33. A beverage brewing apparatus according to claim 32, wherein of said piston member has a first end portion having a relatively large diameter for sealing said throat and a second portion having a relatively small diameter for sealing the drain hole, the diameter of said throat being greater than the diameter of said drain hole; and said at least one exit port including a discharge nozzle on said upper end portion of said piston and extending downwardly and outwardly therefrom.

34. A filter assembly for use with a beverage brewing apparatus, said filter assembly receiving a quantity of brewing substance therein for infusion with water for extracting a brewed beverage therefrom, said filter assembly comprising a funnel member having an inlet throat and a drain opening, a support sieve, and a covering filter member overlying said support sieve; said support sieve being disposed in said funnel member and said covering filter member being supported on said support sieve; a multiplicity of sieve perforations formed through said support sieve, said sieve perforations being sized and dimensioned for passing a brewed beverage therethrough; a multiplicity of cover pores formed through said covering filter member, said cover pores being sized and dimensioned smaller than said sieve perforations; an intersecting lattice structure of cross members forming said cover pores, each lattice crossmember being generally cross sectionally oval; brewed beverage passing through said filter material and said sieve draining into said funnel member.

* * * * *

UNITED STATES PATENT AND TRADEMARK OFFICE
CERTIFICATE OF CORRECTION

PATENT NO. : 5,134,925

DATED : August 4, 1992

INVENTOR(S) : Arthur H. Bunn, James H. Anson and David F. Ford

It is certified that error appears in the above-identified patent and that said Letters Patent is hereby corrected as shown below:

Column 10, Line 48 "brewing, and flushing operations" should read
— brewing, and flushing positions —

Column 11, Line 44 "partially extend" should read — partially extending —

Column 15, Line 13 "a brew chamber assembly having as throat" should read
— a brew chamber assembly having a throat —

Signed and Sealed this

Twelfth Day of October, 1993

Attest:

BRUCE LEHMAN

Attesting Officer          Commissioner of Patents and Trademarks